United States Patent
Chan et al.

(10) Patent No.: US 9,654,439 B2
(45) Date of Patent: May 16, 2017

(54) METHODS AND GATEWAYS FOR PROCESSING DNS REQUEST

(71) Applicant: Pismo Labs Technology Limited, Hong Kong (HK)

(72) Inventors: Ho Ming Chan, Hong Kong (HK); Chi Pan Yip, Hong Kong (HK); Min-Fu Tsai, New Taipei (TW); Alex Wing Hong Chan, Hong Kong (HK); Kit Wai Chau, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 14/125,950

(22) PCT Filed: Nov. 5, 2012

(86) PCT No.: PCT/IB2012/056153
§ 371 (c)(1),
(2) Date: Dec. 13, 2013

(87) PCT Pub. No.: WO2014/068373
PCT Pub. Date: May 8, 2014

(65) Prior Publication Data
US 2014/0379916 A1    Dec. 25, 2014

(51) Int. Cl.
*H04L 29/12* (2006.01)
*H04L 12/64* (2006.01)
*H04L 12/24* (2006.01)

(52) U.S. Cl.
CPC .......... *H04L 61/10* (2013.01); *H04L 12/6418* (2013.01); *H04L 41/046* (2013.01); *H04L 61/1511* (2013.01); *H04L 61/60* (2013.01)

(58) Field of Classification Search
CPC ................ H04L 29/12066; H04L 61/1511
(Continued)

(56) References Cited

U.S. PATENT DOCUMENTS 5,777,989 A *   7/1998   McGarvey ................. 370/254
7,099,957 B2 *  8/2006   Cheline et al. ............. 709/245
(Continued)

FOREIGN PATENT DOCUMENTS

CN    101764855 A  *  6/2010  ............ H04L 12/66
CN    101841577 A     9/2010
JP    2005184110 A    7/2005

OTHER PUBLICATIONS

Anderson et al., "Improving Web Availability for Clients with Monet," Proceedings of the 2nd conference on Symposium on Networked Systems Design & Implementation, vol. 2, 2005, pp. 115-128.*

(Continued)

*Primary Examiner* — Vivek Srivastava
*Assistant Examiner* — William C McBeth

(57) ABSTRACT

Methods and systems for processing Domain Name Service (DNS) request in a gateway with a plurality of WAN network interfaces. After receiving a first DNS request via one of network interfaces of the gateway, the gateway selects at least one DNS server and at least one access network and then transmits a plurality of new DNS requests to the selected at least one DNS server through the selected at least one access network and via one of network interfaces of the gateway.

18 Claims, 5 Drawing Sheets

(58) Field of Classification Search
USPC ....... 709/217, 218, 219, 225, 227, 230, 238, 709/239, 245
See application file for complete search history.

(56) References Cited

U.S. PATENT DOCUMENTS

| | | | |
|---|---|---|---|
| 7,734,683 B1* | 6/2010 | Bergenwall et al. .......... | 709/203 |
| 2003/0195984 A1* | 10/2003 | Zisapel ............. | H04L 29/12066 |
| | | | 709/238 |
| 2005/0044234 A1* | 2/2005 | Coughlin et al. ............. | 709/227 |
| 2010/0121981 A1* | 5/2010 | Drako ........................... | 709/245 |
| 2011/0173339 A1* | 7/2011 | Zhang .......................... | 709/229 |

OTHER PUBLICATIONS

Mockapetris, "RFC1034: Domain Names—Concepts and Facilities," Network Working Group, Nov. 1987.*
Mockapetris, "RFC1035: Domain Names—Implementation and Specification," Network Working Group, Nov. 1987.*
Vulimiri et al., "More is Less: Reducing Latency via Redundancy," Proceedings of the 11th ACM Workshop on Hot Topics in Networks, Oct. 29-30, 2012, pp. 13-18.*
Machine Translation of CN101764855 A obtained from USPTO's Global Patent Search Network.*
International Search Report in International Application No. PCT/IB2012/056153, mailed on Aug. 15, 2013.
Written opinion of the International Searching Authority in International Application No. PCT/IB2012/056153, mailed on Aug. 15, 2013.

* cited by examiner

METHODS AND GATEWAYS FOR PROCESSING DNS REQUEST

TECHNICAL FIELD

This disclosure relates in general to the field of computer networks. More particularly, the present invention relates to a method and an apparatus for processing Domain Name Service (DNS) request in a gateway with a plurality of wide area network (WAN) network interfaces.

BACKGROUND ART

The Domain Name System (DNS) is a hierarchical distributed naming system for computers, services, or any resource connected to the Internet or a private network. It associates various information with domain names assigned to each of the participating entities. A DNS resolves request for these names into IP addresses for the purpose of locating computer services and devices worldwide. It has been a desire for those who skilled in the art to increase the speed of replying the DNS request with higher reliability. The state-of-art techniques are to have DNS proxy to cache DNS reply and to place DNS servers close to the edge of the network. However, state-of-art techniques do not take advantage of the situation when the gateway is connected to a plurality of access networks.

DISCLOSURE OF INVENTION

Summary

According to one of the embodiments of the present invention, after a gateway receives a DNS request from a host, the gateway creates a plurality of new DNS requests corresponding to the received DNS request to at least one DNS server via at least one access network. The DNS server and access network for sending the plurality of new DNS requests are selected by the gateway.

According to one of the embodiments of the present invention, after a gateway receives one or more DNS responses corresponding to the new DNS requests, the gateway selects one of the received DNS responses to the host.

BRIEF DESCRIPTION OF DRAWINGS

For a more complete understanding of the present disclosure and its advantages, reference is now made to the following description taken in conjunction with the accompanying drawings, in which like reference numerals represent like parts.

DETAILED DESCRIPTION OF THE PREFERRED EMBODIMENT

Figure 1A:
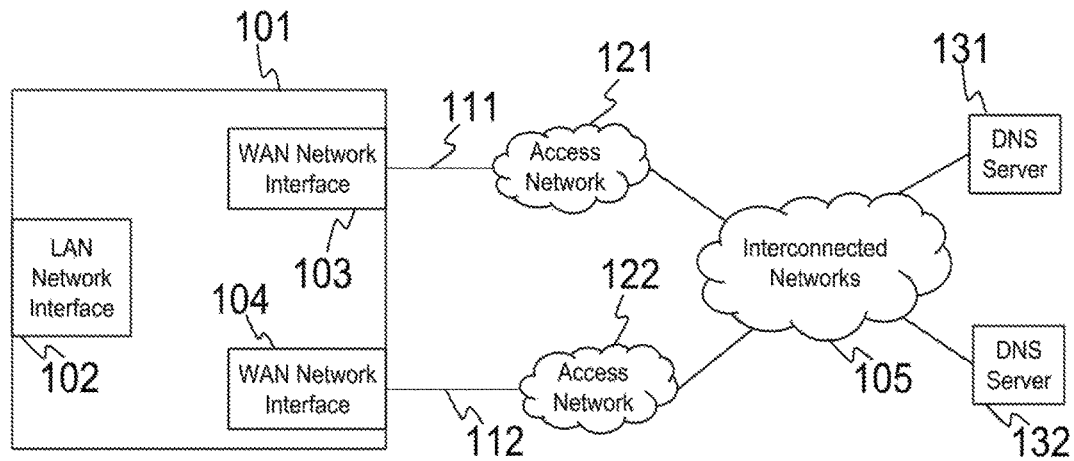
FIG. 1a is a network environment diagram in which hosts and DNS server may connect to the gateway in accordance with one embodiment of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the terms "computer readable storage medium", "storage" and "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processing unit(s) may perform the necessary tasks. A code segment or program instruction may represent a procedure, a function, a subprogram, a program, a routine, a subroutine, a module, a software package, a class, or any combination of instructions, data structures, or program statements. A code segment may be coupled to another code segment, a program instruction or a hardware circuit by passing and/or receiving information, data, arguments, parameters, or memory contents. Information, arguments, parameters, data, etc. may be passed, transmitted, or transmitted via any suitable means including memory sharing, message passing, token passing, network transmission, etc.

An access network allows the gateway to connect to other networks, such as the Internet and the extranet. To determine whether a network is accessible or not, the gateway may periodically sending out packets to test accessibility. For example, the gateway may transmit an ICMP echo request packet to a host and measure the arrival time of the ICMP echo reply packet to determine whether the network is accessible. It would be apparent to those skilled in the art that many more methods and techniques can be used to determine whether a network is accessible.

A presently preferred embodiment of the present invention may utilize a gateway. A gateway is a device or a node on a network which performs protocol conversion between different types of networks or applications and capable of processing DNS requests and responses. The term gateway is not meant to be limited to a single type of device, as any device, hardware or software, that may act as a bridge between the user and the networks may be considered a gateway for purposes of this application. The gateway may couple with a plurality of multiple networks. A router, a switch, a bridge, a wireless access point, a virtual machine in a computing device or any apparatus capable of acting as an access point to another network and handling DNS requests and responses may all be considered as a gateway for purposes of this invention.

A network interface may be implemented by a standalone electronic component or may be integrated with other electronic components. A network interface may have no network connection or at least one network connection depending on the configuration. A network interface is only connected to one access network. Therefore, there may be more than one network connection being carried by one access network. A network interface may be an Ethernet interface, a frame relay interface, a fibre optic interface, a cable interface, a DSL interface, a token ring interface, a serial bus interface, an universal serial bus (USB) interface, Firewire interface, Peripheral Component Interconnect (PCI) interface, etc.

An access network may carry one or more network protocol data, including but not limited to Internet Protocol (IP), IPv4, or IPv6. An access network may be a wired network or a wireless network. An accessible wireless network may be implemented using optical fiber, cables, or any material that can pass information. An accessible wireless network may also be implemented using infra-red, Ethernet, DSL, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO or any other wireless technologies.

FIG. 1a illustrates a network environment in accordance with one of the embodiments of the present invention. Gateway 101 has one local area network (LAN) network interface 102 and two wide area network (WAN) network interfaces 103 and 104 respectively. Two access networks 121 and 122 are connected to WAN network interfaces 103 and 104 via network link 111 and 112 respectively. Therefore, gateway 101 has two access networks for connecting to interconnected networks 105, which can be the Internet. Access networks 121 and 122 may be provided by the same or different Internet Service Providers (ISPs). For example access network 121 connected to WAN network interface 103 may be provided by Verizon using DSL technology and access network 122 connecting to WAN network interface 104 may be provided by Sprint using LTE technology. DNS servers 131 and 132 are accessible by gateway 101 via WAN network interface 103 and 104.

When gateway 101 receives a first DNS request from a sender via LAN network interface 102, it selects at least one DNS server, such as DNS Server 131 or 132, and at least one access network for transmitting a plurality of new DNS requests. The sender may be a host, a node in a network, a computing device, a network device, a mobile phone, a tablet, a desktop computer, a laptop computer, a meter, a video camera, an audio record, a sound receiver, a video display, a sensor or any electronic device capable of sending DNS request. The first DNS request may be for querying gateway 101 for information related to a domain name. In one variant, when gateway 101 has the information to answer the first DNS request, gateway 101 replies to the first DNS request without transmitting the first DNS request to other DNS servers.

The new DNS requests have the same contents as contained in the first DNS request. In one example, when the first DNS request is for resolving IP address of a domain name "happy.com", all new DNS requests are for resolving IP address of the same domain name "happy.com". In one example, when the first DNS request is to query resource record by type of a domain name "happy.com", all new DNS requests are to query resource record by type of the same domain name "happy.com". In one example, when the first DNS request is to query the mail exchange (MX) record by of "yahoo.com", all new DNS requests are to query the MX record of "yahoo.com". For each selected DNS server, gateway 101 transmits a new DNS request to it via one of the selected access networks. Therefore, gateway 101 may transmit more than one new DNS requests to a selected DNS server through two different selected access networks. Also, gateway 101 may transmit a plurality of new DNS requests to different selected DNS servers. However, gateway 101 only transmits one new DNS request to one selected DNS server through one selected access network. Gateway 101 does not transmit more than one new DNS request to the same selected DNS server through the same selected access network unless for retransmitting the new DNS request. This is because the performance improvement and reliability improvement by sending more than one new DNS request to the same selected DNS server through the same selected access network is minimal.

As gateway 101 can connect to both DNS server 131 and 132 via access networks 121 and 122 by using WAN network interface 103 and 104 respectively, gateway 101 has four alternatives to transmitting the new DNS requests. The first alternative is to transmit one of the new DNS requests to DNS Server 131 via access network 121 and via WAN network interface 103. The second alternative is to transmit one of the new DNS requests to DNS Server 131 via access network 122 and via WAN network interface 104. The third alternative is to transmit one of the new DNS requests to DNS Server 132 via access network 121 and via WAN network interface 103. The fourth alternative is to transmit one of the new DNS requests to DNS Server 132 via access network 112 and via WAN network interface 104. Gateway 101 selects at least two of the four alternatives to transmit the new DNS requests. The benefits of using more than one alternative to transmit the new DNS requests includes increasing the speed of resolving the first DNS request and increasing the reliability of resolving the first DNS request.

Figure 1B:
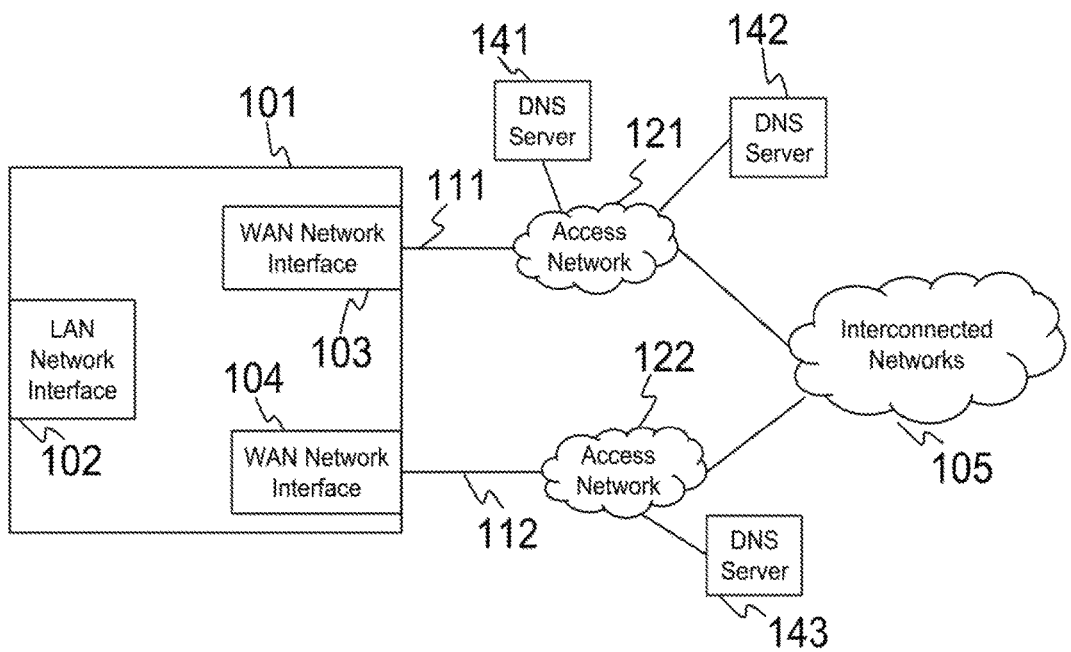
FIG. 1b is a network environment diagram in which hosts and DNS server may connect to the gateway in accordance with one embodiment of the present invention.

FIG. 1b illustrates a network environment in accordance with one of the embodiments of the present invention. FIG. 1b is different from FIG. 1a that access network 121 is connected to DNS server 141 and 142 directly without passing through interconnected networks 105 and access network 122 is connected to DNS server 143 directly without passing through interconnected networks 105. In addition, DNS server 141 and 142 are restricted for hosts connecting to access network 121 and DNS server 143 is restricted for hosts connecting to access network 122. Therefore, gateway 101 cannot access DNS server 143 via WAN network interface 103 and cannot access DNS server 141 and 142 via WAN network interface 104. When gateway 101 has selected one or more DNS servers for resolving DNS request, gateway 101 will then determine which WAN network interface is used to transmit the one or more new DNS requests. Alternatively, when gateway 101 has selected one or more WAN network interfaces for transmitting the one or more new DNS requests, gateway 101 will then determine which DNS servers will be used for solving the new DNS requests.

A new DNS request has the same content or query contained in the first DNS request. For illustration purpose, when the first DNS request is for resolving IP address of a domain name "happy.com", all new DNS requests are for resolving IP address of the same domain name "happy.com". For each of selected DNS servers, gateway 101 transmits one of the new DNS requests to it via one of the selected access networks. Therefore, gateway 101 may transmit more than one new DNS request to a selected DNS server through two different selected access networks. Also, gateway 101 may transmit a plurality of new DNS requests to different selected DNS servers. However, gateway 101 only transmits one new DNS request to one selected DNS server via one selected access network. Gateway 101 does not transmit more than one new DNS request to the same selected DNS server through the same selected access network. This is because the performance improvement and reliability improvement by sending more than one new DNS request to the same selected DNS server through the same selected access network is minimal.

Method

Transmitting DNS Requests

Figure 2:
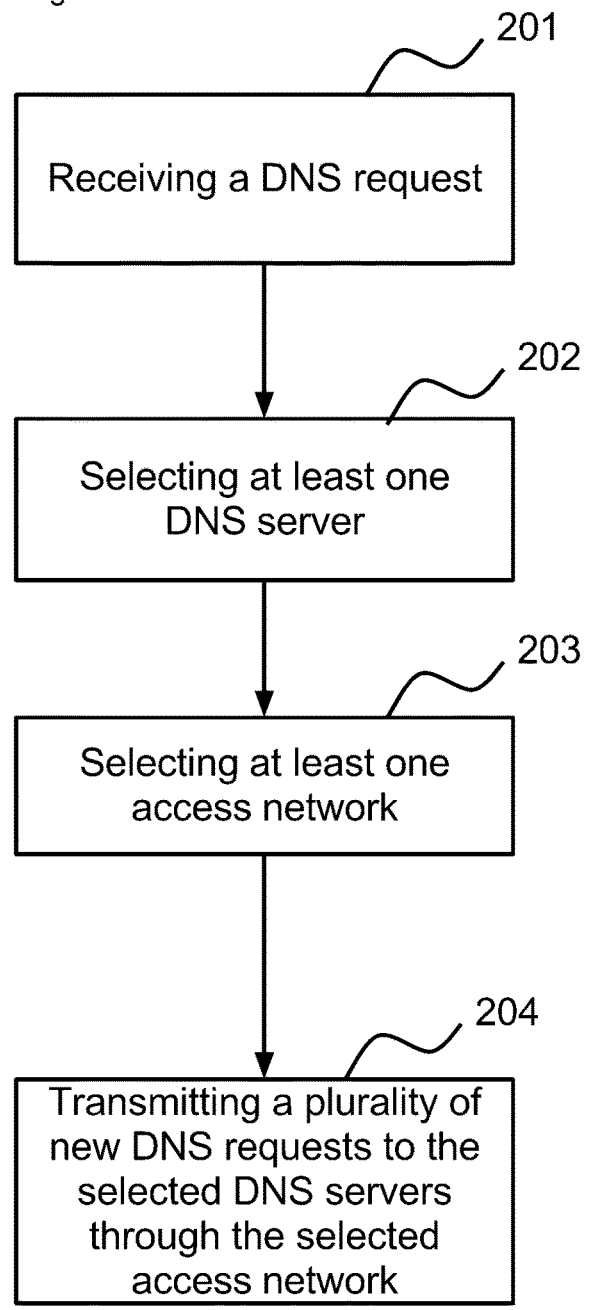
FIG. 2 is a flowchart diagram of a process of processing a received DNS request in accordance with one embodiment of the present invention.

FIG. 2 is a flowchart illustrating the steps of one of the embodiments of the present invention. To illustrate the embodiment, FIG. 1a is used in conjunction with FIG. 2. When a gateway receives a first DNS request at step 201 via LAN network interface 102, gateway 101 selects at least one DNS server at step 202 and selects at least one access network at step 203. The DNS servers available for selection may be configured by the administrator of the gateway manually, provided by the service provider of an access network, retrieved from a storage system of the gateway, or obtained from a DHCP message.

When gateway 101 selects DNS server 131 or 132, gateway 101 also selects an access network 121 or 122 that is authorized to send the new DNS request to that selected DNS server, because some DNS servers only respond to DNS requests that are originated from authorized IP addresses. In one variant, gateway 101 selects at least one DNS server at step 202 and selects at least one access network at step 203 randomly, according to a pre-defined policy. In one example, the pre-defined policy is to select the DNS server and access network based on configuration entered by the gateway administrator. In one example, the pre-defined policy is to select the DNS server and access network based on availability. In one example, the pre-defined policy is to select the DNS server and access network based on configuration entered by the gateway administrator. In one example, the pre-defined policy is to select the DNS server and access network based on statistical analysis of DNS responses received from the DNS server via the accessible networks. In one example, the pre-defined policy is to select the DNS server and access network based on historical average DNS response speed with valid respond code.

For illustrative purpose, gateway 101 selects DNS Server 131 via access network 121 and via WAN network interface 103, DNS Server 131 via access network 122 and via WAN network interface 104, and DNS Server 132 via access network 121 and via WAN network interface 103. Therefore, at step 204, gateway 101 creates three new DNS requests and then transmits a new DNS request to DNS Server 131 via WAN network interface 103, another new DNS request to DNS Server 131 via WAN network interface 104 and another new DNS request to DNS Server 132 via WAN network interface 103.

At step 204, the new DNS requests are transmitted to the selected DNS servers through the selected access networks.

According to one of the embodiments of the present invention, the order of performing step 202 and step 203 may be interchanged or merged as a single step.

In one of the embodiments of the present invention, FIG. 2 also illustrates the steps of the embodiments in conjunction with FIG. 1b. DNS servers 141 and 142 are only accessible through access network 121. DNS server 143 is only accessible through access network 122.

When a gateway receives a first DNS request at step 201 via LAN network interface 102, gateway 101 selects at least one DNS server at step 202 and selects at least one access network at step 203. The DNS servers available for selection may be configured by the administrator of the gateway manually, provided by the service provider of an access network, retrieved from a storage system of the gateway, or obtained from a DHCP message.

When gateway 101 selects DNS server 141 or 142, gateway 101 uses access network 121 to send the new DNS request to the selected DNS server. When gateway 101 selects DNS server 143, gateway 101 uses network 121 to send the new DNS request to the DNS server 143.

For illustrative purpose, gateway 101 selects DNS Server 141 and 143. Therefore, at step 204, gateway 101 creates two new DNS requests and then transmits a new DNS request to DNS Server 141 via WAN network interface 103, and another new DNS request to DNS Server 143 via WAN network interface 103.

At step 204, the new DNS requests are transmitted to the selected DNS servers through the selected access networks.

According to one of the embodiments of the present invention, the order of performing step 202 and step 203 may be exchanged or merged as a single step.

According to one of the embodiments of the present invention, when there are n number of DNS servers and m number of access networks, there are altogether n times m available combinations of DNS servers and access networks. The gateway selects at least two of such combinations of DNS servers and access networks for transmitting a plurality of new DNS requests. Therefore, when the gateway only selects one DNS server, the gateway selects at least two access networks; when the gateway only selects one access network, the gateway selects at least two DNS servers. The new DNS requests correspond to the first DNS request, such that the queries of the new DNS requests are the same as the query of the first DNS request. It would be apparent to those skilled in the art that many more methods and techniques may be used to create the new DNS requests according to the query of the first DNS request.

Receiving DNS Response

According to one of the embodiments of the present invention, after the new DNS requests are transmitted, gateway 101 may receive none, one or more DNS responses in response to the new DNS requests from the selected DNS servers, such as DNS server 131 and 132. Gateway 101 can transmit one, more than one new DNS responses to the sender of the first DNS request. The sender of the first DNS request is host, which sends a DNS request to gateway 101 via LAN network interface 102. A new DNS response transmitted by the gateway contains the same response from the DNS response received by the gateway 101.

A received DNS response is considered valid when it has a return code (RCODE) of zero. It would be apparent to those skilled in the art that the Internet Assigned Numbers Authority has assigned different meanings for different RCODE. It would also be apparent to those skilled in the art that many more methods and techniques can be used to process other DNS responses when a DNS response has already been transmitted to the sender of the first DNS request.

Figure 3:
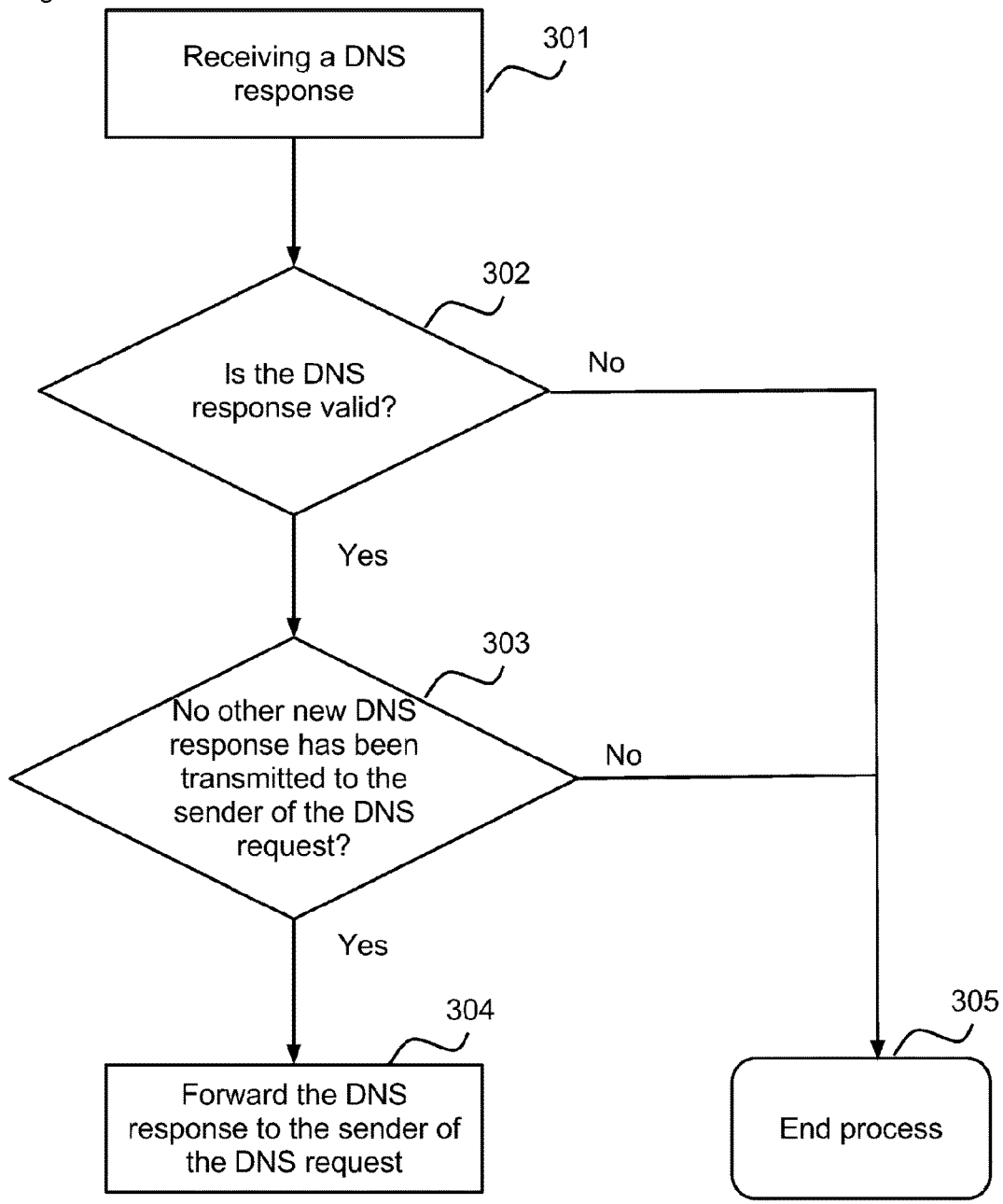
FIG. 3 is a flowchart diagram of a process of processing a received DNS response in accordance with one embodiment of the present invention.

FIG. 3 is a flowchart illustrating one of the embodiments of the present invention. To illustrate the embodiment, FIG. 1a is used in conjunction with FIG. 3. Gateway 101 receives a DNS response at step 301 from one of DNS server 131 and 132. Gateway 101 forwards a new DNS response to the sender of the first DNS request at step 304 only when the DNS response received by gateway 101 is confirmed valid at step 302 and no other new DNS response has been transmitted to the sender of the first DNS request before at step 303. Therefore, the sender of the first DNS request only receives one new DNS response for the first DNS request it sent earlier. If other DNS responses have been received by the gateway later, the gateway discards these Received DNS responses at step 305.

In the forwarding performed at step 304, gateway 101 creates a new DNS response and transmits the new DNS response to the sender of the first DNS request. The content of the new DNS response is the same as the content in the DNS response received at 301. For example, the value of the RCODE in the new DNS response transmitted to the sender of the first DNS request is the same as the RCODE of one of the DNS responses.

If there is one or more invalid DNS responses received by gateway 101 before the first valid DNS response is received, the one or more invalid DNS responses are discarded after the new DNS response is transmitted to the sender of the first DNS request.

According to one of the embodiments of the present invention, when no DNS response corresponding to the new DNS requests has been received by gateway 101 within a pre-defined time period, gateway 101 transmits a new DNS response with a non-zero RCODE to the sender of the first DNS request. The value of the pre-defined time period may be determined by the manufacturer of the gateway, the administrator of the gateway, and/or by the host. In one variant, the pre-defined time period is in the range of one hundred milliseconds to twenty seconds. The reason why no DNS response is received by gateway 101 after a pre-defined period of time may be that no received DNS responses has a RCODE of zero or no DNS response has been received from any of selected DNS servers.

According to one of the embodiments of the present invention, when gateway 101 has received more than one DNS response and none of these received DNS responses are considered valid before the pre-defined timeout, gateway 101 has to determine how to respond to the sender of the first DNS request. According to one of the embodiments of the present invention, gateway 101 transmits a new DNS response to the sender of the first DNS request with the contents retrieved from one of the received DNS responses. In one variant, for example, the RCODE in the DNS response transmitted to the sender of the first DNS request is the majority of the RCODE contained in all DNS responses received by gateway 101. In one variant, the RCODE in the DNS response transmitted by gateway 101 to the sender of the first DNS request is chosen randomly from one of the DNS responses received by gateway 101.

According to one of the embodiments of the present invention, when gateway 101 has received all DNS responses corresponding to all new DNS requests and none of these DNS responses are considered valid, gateway 101 transmits a new DNS response to the sender of the first DNS request. The content of the new DNS response is selected from one of the received DNS responses. The selection can be determined randomly, statistically, according to the time of receiving or according to the order of receiving.

According to one of the embodiments of the present invention, when gateway 101 has received all DNS responses corresponding to all new DNS requests and none of these DNS responses are considered valid, gateway 101 transmits a new DNS response to the sender of the first DNS request. The content of the new DNS response is selected from one of the received DNS responses. The selection, of which of the received DNS responses the new DNS response should be selected from, can be determined randomly, statistically, according to the time of receiving or according to the order of receiving.

Figure 4:
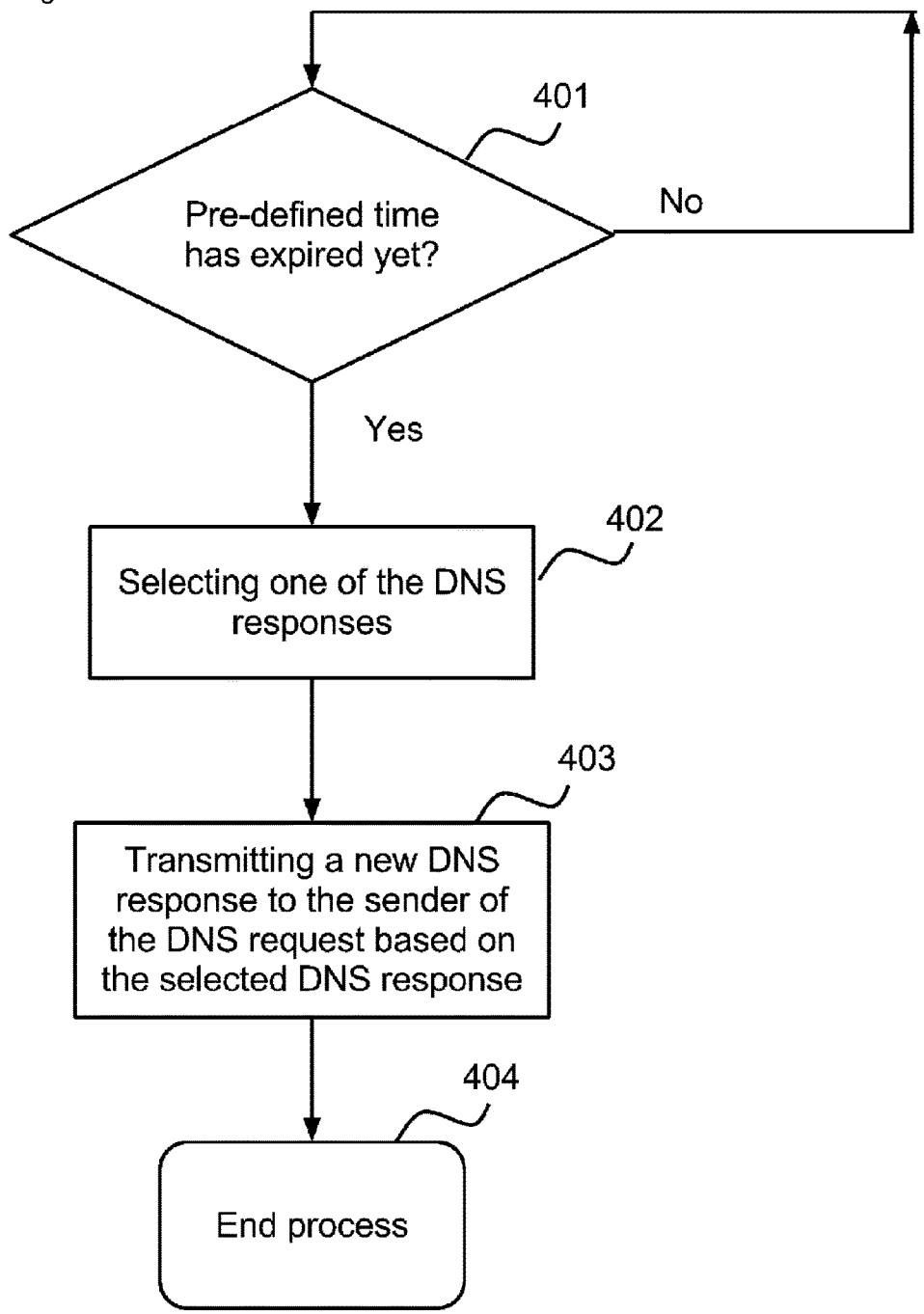
FIG. 4 is a block diagram of a gateway in accordance with one embodiment of the present invention.

FIG. 4 is a flow chart illustrating one of the embodiments of the present invention. To illustrate the embodiment, FIG. 1a is used in conjunction with FIG. 4. If a pre-defended time has not expired at gateway 101, gateway 101 waits until the pre-defined time expires while storing DNS responses corresponding to the new DNS request, which was received via LAN network interface 102 in the memory at step 401.

At step 402, gateway 101 selects one of the DNS responses. There are many ways in which gateway 101 performs selection of the DNS responses, including ways based on the time of arrival, the contents of the DNS responses, the identity of the DNS servers, the source of the DNS responses, etc. According to one of the embodiments of the present invention, the selection of DNS responses is according to a pre-defined policy. In one example, the selection policy is to select a DNS response from DNS server 131 if the DNS response is available before the pre-defined time has expired. In one example, if no DNS response is available before the pre-defined time. In one example, the policy is to select a DNS response which arrives at the DNS server 131 the earliest. In one example, the settings of the selection policy can be configured by the administrator of gateway 101 remotely or locally.

At step 403, gateway 101 transmits a new DNS response to the sender of the first DNS request based on the selected DNS response.

Apparatus

Figure 5:
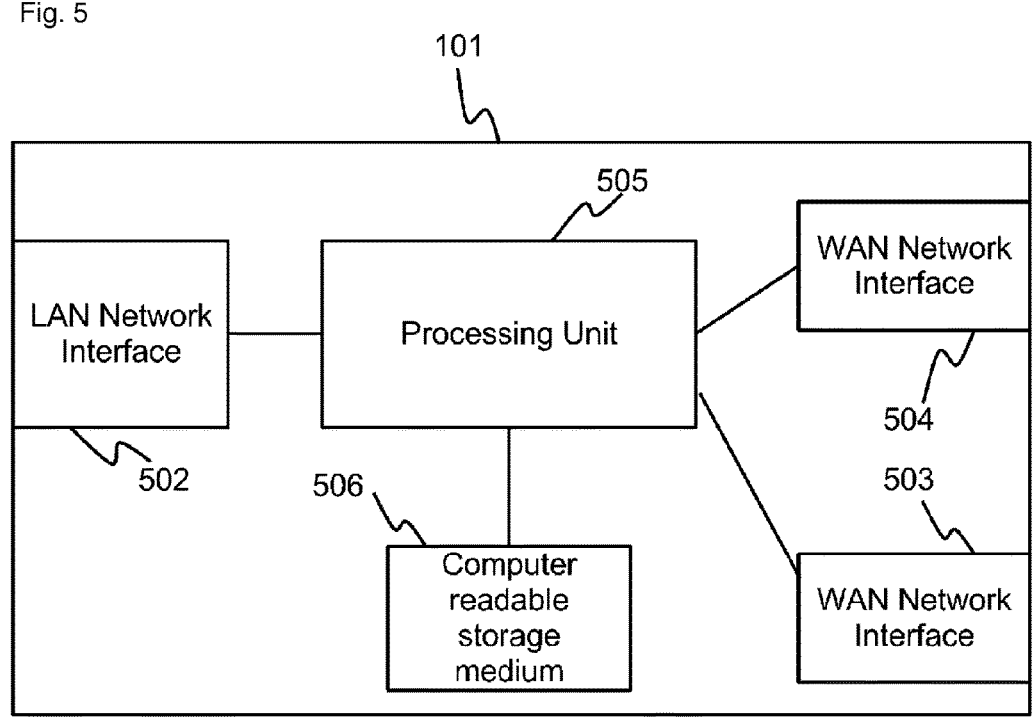
FIG. 5 illustrates a gateway with the capability to process DNS request according to the present invention described.

FIG. 5 illustrates one of the embodiments of present invention of a gateway with the capability to process DNS request according to the present invention described. Gateway 101 comprises a processing unit(s) 505, a computer readable storage medium 506, at least one LAN network interface 502, and a plurality of WAN interfaces, such as a first WAN interface 503 and a second WAN interface 504, for use with other network apparatus such as Ethernet switches, IP routers and other packet network devices, network management and provisioning systems, local PCs, etc. Other components which may be utilized within gateway 101 include amplifiers, board level electronic components, as well as media processors and other specialized SoC or ASIC devices. Support for various processing layers and protocols (e.g., 802.3, DOCSIS MAC, DHCP, SNMP, H.323/RTP/RTCP, VoIP, SIP, etc.) may also be provided as required.

Gateway 101 may take any number of physical forms, comprising, for example one of a plurality of discrete modules or cards within a larger network edge or hub device of the type well known in the art and may also comprise firmware, either alone or in combination with other hardware/software components. Alternatively, gateway 101 may be a stand-alone device or module disposed at other computing device or network device, and may even include its own Radio Frequency (RF) front end (e.g., modulators, encryptors, etc.) or optical interface so as to interface directly with other computing devices and network devices. Numerous other configurations may be used. Gateway 101 may also be integrated with other types of components (such as mobile base stations, satellite transceivers, video set-top box, encoders/decoders, etc.) and form factors if desired.

Processing unit(s) 505 may be implemented by using one or more central processing units, network processors, microprocessors, micro-controllers, FPGAs, ASICs or any device capable of performing instructions to perform the basic arithmetical, logical, and input/output operations of the system.

Computer readable storage medium 506 may be implemented by using at least one DRAM, SDRAM, Flash RAM, optical memory, magnetic memory, hard disk, and/or any computer readable media that are able to provide storage capability. Computer readable storage medium 506 may be used to provide instructions to processing unit 505, to provide storage to store identifiers, conditions, network performance statistics and other data to facilitate the operation of the gateway.

When processing unit(s) 505 performs selection according to a pre-defined policy, processing unit(s) 505 retrieves information corresponding to the pre-defined policy from computer readable storage medium 506, and then performs necessary logical operation and arithmetical calculation in order to perform the selection.

A plurality of WAN interfaces at gateway 101, such as WAN interfaces 503 and 504, may be implemented using serial bus, universal serial bus (USB), parallel bus, a universal asynchronous receiver/transmitter (UART), Peripheral Component Interconnect (PCI), local bus, or other electronic components connecting technology to connect processing unit(s) 505 and an agent, which is used to be connected with optical fiber, cable, or antenna. In one variant, at least one of the plurality of WAN interfaces is in the processing unit(s) 505 and therefore the agent for connecting with optical fiber, cables or antenna may directly connect with the processing unit 505. In one variant, at least one WAN interface may connect to an Ethernet port for Ethernet WAN network connection. In one variant, at least one of the plurality of WAN interfaces may connect to an Wi-Fi adapter for Wi-Fi network connection. In one variant, at least one of the plurality of WAN interfaces may connect to a USB port and the USB port may connect to an external modem for wireless WAN connection, such as a USB 3G modem, USB LTE modem, USB WiMax Modem, USB Wi-Fi Modem, or other modem for wireless communications. In one variant, all of the plurality of WAN interfaces connect a plurality of USB ports for external modem connections. In one variant, all of the plurality of WAN interfaces connect to circuitry inside gateway 101. Myriad other combinations and permutations of the foregoing will be appreciated by those of ordinary skill given the present disclosure.

When gateway 101 receives a first DNS request via LAN network interface 502, which is described as first DNS request in FIG. 1, processing unit(s) 505 selects at least one DNS server and selects at least one access network, which is connected to WAN network interface 503 or 504. The DNS servers available for selection may be configured by the administrator of gateway 101 manually, provided by the service provider of an access network, retrieved from Computer readable storage medium 506, or obtained from at least one DHCP message. According to one of the embodiments of the present invention, when processing unit(s) 505 selects a DNS server, processing unit 505 also selects an access network that is authorized to send a new DNS request to that selected DNS server, because some DNS servers only respond to DNS requests originated from authorized IP addresses.

According to one of the embodiments of the present invention, the first DNS request is received from a sender through LAN network interface 502.

Processing unit(s) 505 may select DNS server and select access network randomly, according to a pre-defined process, according to statistical values or etc. It would be apparent to those skilled in the art that many more methods and techniques may be used for the selection.

As described above, there are altogether n times m available combinations of DNS server and access network. Processing unit(s) 505 selects at least two of such combinations of DNS server and access network for transmitting a plurality of new DNS requests. Therefore, when processing unit 505 only selects one DNS server, processing unit 505 selects at least two access networks; when processing unit 505 only selects one access network, processing unit 505 selects at least two DNS servers. The new DNS requests correspond to the first DNS request, such that the queries of the new DNS requests are the same as the query of the first DNS request. It would be apparent to those skilled in the art that many more methods and techniques may be used to create the new DNS requests according to the query of the first DNS request.

The new DNS requests are transmitted to the selected DNS servers through the selected access networks connected to WAN network interface 503 and/or 504.

After the new DNS requests are transmitted, processing unit(s) 505 may receive DNS responses from one of the plurality of WAN network interfaces to respond to the new DNS requests from the selected DNS servers. Processing unit(s) 505 transmits one, more than one or all the received DNS responses to the host. The new DNS response contains the same response from the received DNS response. The sender of the first DNS request is a host, which sends of the first DNS request to gateway 101 via LAN network interface 502.

According to one of the embodiments of the present invention, processing unit 505 transmits all the received DNS responses to the host.

When gateway 101 receives DNS responses, processing unit 505 transmits a new DNS response to the host only when the received DNS response is valid and no other new DNS response has been transmitted to the host. Therefore, the host only receives a DNS response for the first DNS request it sent earlier. If other DNS responses with a RCODE of zero have been received by gateway 101, processing unit 505 discards these received DNS responses.

According to one of the embodiments of the present invention, when no new DNS response has been transmitted to the host after a pre-defined timeout, processing unit 505 transmits a new DNS response with a non-zero RCODE. The value of the pre-defined timeout is stored at computer readable storage medium 506. In one variant, processing unit 505 sets the value of the RCODE in the new DNS response to be the same as the RCODE of one of the received DNS responses. When gateway 101 has received more than one DNS responses and none of these Received DNS responses are valid before the pre-defined timeout, processing unit 505 may determine how to respond to the first DNS request. The DNS responses received may be stored at computer readable storage medium 506. According to one of the embodiments of the present invention, processing unit 505 transmits a new DNS response to the host with a RCODE retrieved from one of the received DNS responses. In one variant, the RCODE in the first DNS request is the majority RCODE contained in all received DNS responses. In one variant, for example, the RCODE in the first DNS request is chosen randomly from one of the received DNS responses.

In one example, the pre-defined policy is to select a DNS response among all received DNS responses according to the arrival time of the received DNS responses within a time threshold. When a DNS response is received by gateway 101 via one of the network interfaces 503 or 504, processing unit(s) 505 stores the arrival times of the received DNS responses in computer readable storage medium 506 first. When the time threshold is reached, processing unit(s) 505 retrieves all the arrival times from computer readable storage medium 506 to select the DNS response that arrived the earliest with a valid code.

The invention claimed is:

1. A method for processing Domain Name Service (DNS) request in a gateway with a plurality of network interfaces, the method comprising:
   receiving a first DNS request from a host via one of the network interfaces of the gateway;
   when the gateway does not have information to respond to the first DNS request:
   a. selecting, according to at least one predefined selection policy, at least one DNS server;
   b. selecting at least one access network that is authorized to send new DNS requests to the selected at least one DNS server;
   c. transmitting a plurality of new DNS requests to the selected at least one DNS server through the selected at least one access network and via one of the network interfaces of the gateway that is capable of connecting to the selected at least one access network; wherein the selected at least one DNS server is not restricted to be belonging to the service provider of the selected at least one access network; wherein the content of the new DNS requests are the same as the content of the first DNS request;
   d. receiving a plurality of DNS responses corresponding to the plurality of new DNS requests within a pre-defined time period;
   e. storing the plurality of DNS responses;
   f. when the pre-defined time period has expired: selecting a DNS response from the received plurality of DNS responses according to at least one predefined pre defined DNS response selection policy; wherein when at least one of the plurality of DNS responses is valid, the predefined DNS response selection policy is to select one of the at least one valid DNS responses based on time of arrival, contents of each of the plurality of DNS responses, identity of DNS servers from which each of the plurality of DNS responses are received, or source of each of the plurality of DNS responses; wherein when none of the plurality of DNS responses are valid: the pre-defined DNS response selection policy is to select one of the plurality of DNS responses randomly, statistically, according to the time of receiving or according to the order of receiving;
   g. transmitting a new DNS response to the host wherein the content of the new DNS response is based on the content of the selected DNS response; wherein if the selected DNS response is not a valid DNS response, setting a return code (RCODE) of the new DNS response to an RCODE contained in a majority of the plurality of DNS responses; and
   when the gateway has information to respond to the first DNS request:
   h. responding to the first DNS request; and not transmitting the plurality of new DNS requests.

2. The method of claim 1, wherein when a number of DNS servers selected is one, a number of access networks selected is at least two; and
   wherein when the number of access networks selected is one, the number of DNS servers selected is at least two;
   wherein the selected at least one DNS server is one of a plurality of DNS servers that are available for selection;
   wherein the plurality of DNS servers that are available for selection is configured by an administrator of the gateway, a service provider of the at least one access network, a storage medium of the gateway, or a dynamic host configuration protocol (DHCP) message.

3. The method of claim 1, wherein the predefined selection policy is to select the at least one DNS server and the at least one access network based on availability of a plurality of DNS servers and a plurality of access networks.

4. The method of claim 1, wherein the predefined selection policy is to select the at least one DNS server and the at least one access network based on historical average DNS response speed with valid respond code.

5. The method of claim 1, wherein the predefined selection policy is to select the at least one DNS server and the at least one access network based on statistical analysis of DNS responses received from a plurality of DNS servers through a plurality of access networks.

6. The method of claim 1, wherein the predefined DNS response selection policy is to select a first DNS response received from a first DNS server.

7. The method of claim 1, wherein step (f) is performed when no other DNS response corresponding to the plurality of new DNS requests has been transmitted to the host.

8. The method of claim 1, wherein the new DNS response has a non-zero return code when no DNS response corresponding to the plurality of new DNS requests is received within a predefined time period.

9. The method of claim 1, step (c) further comprising transmitting one new DNS request to a first DNS server through a first access network.

10. A gateway for processing DNS request comprising:
a plurality of wide area network (WAN) interfaces;
at least one local area network (LAN) interface;
a processing unit;
and a computer readable storage medium comprising program instructions executable by the processing unit to perform die operation:
receiving a first DNS request from a host via one of the network interfaces of the gateway;
when the gateway does not have information to respond to the first DNS request:
a. selecting, according to at least one predefined selection policy, at least one DNS server;
b. selecting at least one access network that is authorized to send new DNS requests to the selected at least one DNS server;
c. transmitting a plurality of new DNS requests to the selected at least one DNS server through the selected at least one access network and via one of the network interfaces of the gateway that is capable of connecting to the selected at least one access network; wherein the selected at least one DNS server is not restricted to be belonging to the service provider of the selected at least one access network; wherein the content of the new DNS requests are the same as the content of the first DNS request;
d. receiving a plurality of DNS responses corresponding to the plurality of new DNS request within a pre-defined time period;
e. storing the plurality of DNS responses;
f. when the pre-defined time period has expired: selecting a DNS response from the received plurality of DNS responses according to at least one predefined DNS response selection policy; wherein when at least one of the plurality of DNS responses is valid, the predefined DNS response selection policy is to select one of the at least one valid DNS responses based on time of arrival, contents of each of the plurality of DNS responses, identity of DNS servers from which each of the plurality of DNS responses are received, or source of each of the plurality of DNS responses; wherein when none of the plurality of DNS responses are valid: the predefined DNS response selection policy is to select one of the plurality of DNS responses randomly, statistically, according to the time of receiving or according to the order of receiving;
g. transmitting a new DNS response to the host wherein the content of the new DNS response is based on the content of the selected DNS response; setting a return code (RCODE) of the new DNS response to an RCODE contained in a majority of the plurality of DNS responses; and
h. when the gateway has information to respond to the first DNS request:
responding to the DNS request; and not transmitting the plurality of new DNS requests.

11. The gateway of claim 10, wherein when a number of DNS servers selected is one, a number of access networks selected is at least two; and
wherein when the number of access networks selected is one, the number of DNS sewers selected is at least two;
wherein the selected at least one DNS server is one of a plurality of DNS servers that are available for selection; and
wherein the plurality of DNS servers that are available for selection is configured by an administrator of the gateway, a service provider of the at least one access network, a storage medium of the gateway, or a dynamic host configuration protocol (DHCP) message.

12. The gateway of claim 10, wherein the predefined selection policy is to select the at least one DNS server and the at least one access network based on availability of a plurality of DNS servers and a plurality of access networks.

13. The gateway of claim 10, wherein the predefined selection policy is to select the at least one DNS server and the at least one access network based on historical average DNS response speed with valid respond code.

14. The gateway of claim 10, wherein the predefined selection policy is to select the at least one DNS server and the at least one access network based on statistical analysis of DNS responses received from a plurality of DNS servers through a plurality of access networks.

15. The gateway of claim 10, wherein the predefined DNS response selection policy is to select a first DNS response received from a first DNS server.

16. The gateway of claim 10, wherein step (f) is performed when no other DNS response corresponding to the plurality of new DNS requests has been transmitted to the host.

17. The gateway of claim 10, wherein the new DNS response has a non-zero return code when no DNS response corresponding to the plurality of new DNS requests is received within a predefined time period.

18. The gateway of claim 10, wherein the computer readable storage medium further comprising program instructions executable by the processing unit to perform the operation of: transmitting one new DNS request to a first DNS server through a first access network.

* * * * *